(12) United States Patent
Fröhlich et al.

(10) Patent No.: US 12,259,500 B2
(45) Date of Patent: Mar. 25, 2025

(54) METHOD FOR DETERMINING AND COMPENSATING STRAY LIGHT FROM A 3D LASER SCANNER

(71) Applicant: Zoller & Fröhlich GmbH, Wangen im Allgäu (DE)

(72) Inventors: Christoph Fröhlich, Wangen im Allgäu (DE); Markus Mettenleiter, Isny im Allgäu (DE)

(73) Assignee: ZOLLER & FRÖHLICH GMBH, Wangen im Allgäu (DE)

( * ) Notice: Subject to any disclaimer, the term of this patent is extended or adjusted under 35 U.S.C. 154(b) by 1028 days.

(21) Appl. No.: 17/221,735

(22) Filed: Apr. 2, 2021

(65) Prior Publication Data

US 2021/0311176 A1   Oct. 7, 2021

(30) Foreign Application Priority Data

Apr. 6, 2020 (DE) ..................... 10 2020 109 568.6

(51) Int. Cl.
*G01S 7/493* (2006.01)
*G01S 7/4915* (2020.01)
(Continued)

(52) U.S. Cl.
CPC ............ *G01S 7/493* (2013.01); *G01S 7/4915* (2013.01); *G01S 17/42* (2013.01); *G01S 17/89* (2013.01)

(58) Field of Classification Search
CPC ........ G01S 7/493; G01S 7/4915; G01S 17/42; G01S 17/89; G01S 2007/4975;
(Continued)

(56) References Cited

U.S. PATENT DOCUMENTS 9,056,395 B1 * 6/2015 Ferguson .............. G01S 17/931
9,678,200 B2 * 6/2017 Lange ..................... G01S 7/497
(Continued)

FOREIGN PATENT DOCUMENTS

CN         111708003 A      9/2020
WO      2017208720 A1     12/2017

OTHER PUBLICATIONS

Search Report from German Patent and Trademark Office dated Mar. 2, 2021 for priority application DE 10 2020 109 568.6 with English Translation.
(Continued)

*Primary Examiner* — Luke D Ratcliffe
*Assistant Examiner* — Vicente Rodriguez
(74) *Attorney, Agent, or Firm* — Michael J. McCandlish; Mindful IP Law PLLC

(57) ABSTRACT

A method is disclosed for determining and compensating a proportion of stray light of a measuring beam of a 3D laser scanner by which a 3D point cloud of an object to be detected can be generated via phase-based distance measurement including a first sequence by which first parameters of a proportion of stray light can be determined independently of the 3D point cloud and/or a second sequence by which second parameters of the proportion of stray light dependent on the generated 3D point cloud and a step can be determined. The proportion of stray light can be compensated as a function of the first parameters and/or the second parameters.

18 Claims, 2 Drawing Sheets

(51) Int. Cl.
*G01S 17/42* (2006.01)
*G01S 17/89* (2020.01)

(58) Field of Classification Search
CPC ...... G01S 7/4802; G01S 7/4808; G01S 7/495; G01S 7/497; G01S 17/894; G01S 17/32
See application file for complete search history.

(56) References Cited

U.S. PATENT DOCUMENTS

| | | | |
|---|---|---|---|
| 10,295,657 B2* | 5/2019 | Buettgen | G01S 7/483 |
| 11,536,804 B2* | 12/2022 | Fisher | G01S 7/4863 |
| 11,686,828 B2* | 6/2023 | Schoenlieb | H04N 23/72 |
| | | | 348/222.1 |
| 2015/0122183 A1 | 5/2015 | Oggier | |
| 2017/0214901 A1* | 7/2017 | Zhao | G06T 5/73 |
| 2018/0284228 A1 | 10/2018 | LaChapelle | |
| 2019/0113334 A1 | 4/2019 | Wolke et al. | |
| 2020/0041620 A1 | 2/2020 | Onal et al. | |
| 2020/0064453 A1* | 2/2020 | Vaello Paños | G01S 17/08 |
| 2020/0072946 A1 | 3/2020 | Fisher et al. | |
| 2020/0158826 A1 | 5/2020 | Hinderling et al. | |

OTHER PUBLICATIONS

Extended Europoean Search Report for EP patent application No. 21165921.4 with English Machine Translation.

\* cited by examiner

METHOD FOR DETERMINING AND COMPENSATING STRAY LIGHT FROM A 3D LASER SCANNER

CROSS REFERENCE TO RELATED APPLICATIONS

This application claims priority to German Application No. DE 10 2020 109 658.6 filed on Apr. 6, 2020, which application is hereby incorporated herein by reference in its entirety.

TECHNICAL FIELD

The disclosure relates to a method for determining and compensating stray light of a 3D laser scanner according to the independent claim.

BACKGROUND

Generic laser scanners serve for 3D detection of objects on the basis of distance measurements in which the transit time of a measuring beam is determined from the phase shift of the proportion of the measuring beam reflected by the object to the emitted measuring beam. In contrast to the pulse-based distance measurement, the phase-based method cannot differentiate plural targets located in the spot of a measuring beam, but forms a mean value from the distances and intensities of the targets hit by the spot.

This problem of "plural targets" occurs, for example, when the laser spot illuminates more than one target, for example when it is incident on the edge of the object. One part of the laser spot is then reflected by the object and another part is reflected by the background. A faulty measuring result is formed which corresponds to the mean value from the object and background distances and intensities. Those "mixed pixels" of the background and the object usually occur at edges of the object only and therefore can be filtered out afterwards by a software.

A proportion of stray light of the measuring beam which passes directly from the emitter such as a laser diode to the receiver such as a photodiode, without having been incident on the object to be detected before, cannot be compensated in this way, however.

The proportion of stray light mixes with the proportion of the measuring beam reflected by the object and in this way possibly falsifies distance and/or intensity values. Usually, the proportion of stray light is significantly lower than the reflected proportion of the measuring beam so that the measured distances and intensity values are virtually pure.

However, external influences such as soiling of an otherwise transparent protective glass of the emitter or receiver, can render the proportion of stray light substantially larger. If, in addition, the light reflected by the object to be measured has a low intensity, because the object to be measured is either remote or dark or both, a significant falsification of the measuring result which is expressed, inter alia, in cyclic phase and amplitude errors may occur. Those errors are not evident to the field user. Merely in a distinct form they are evident to the user as a deformation in the measurement data, i.e., in the 3D point cloud. Stray light thus can represent a serious problem to the quality of the data acquired.

SUMMARY

On the other hand, the disclosure is based on the object to provide a method in which the compensation of the aforementioned stray light of a 3D laser scanner can be adapted more individually to existing field conditions so that the quality of the data acquired can be improved.

This object is achieved by a method comprising the features of the independent claim.

Advantageous examples of the method are described in the dependent claims.

A method is provided for determining and compensating a proportion of stray light of a measuring beam of a 3D laser scanner. The latter generates a 3D point cloud of an object to be detected through the measuring principle of phase-based distance measurement. A proportion of stray light in this context is understood to be especially a proportion of a measuring beam emitted by an emitter of the 3D laser scanner which passes from the emitter to a receiver of the 3D laser scanner without impinging on the object to be detected. In accordance with the disclosure, the method includes a selection of two step sequences optionally applicable individually or in combination for determining different stray light parameters. The question whether only one of the two or both step sequences are applied can be decided depending especially on basic conditions under which the object is detected. This can take place depending on the environment, whether the object is detected "outdoors" or "indoors", for example, or whether a view to the open sky is available. Also, a required accuracy and the question whether such accuracy can be achieved already by only one of the step sequences or whether both step sequences are required can have an influence hereon. The decision can be taken especially by an operating person in a manual or automated manner by a control unit of the 3D laser scanner. A first one of the step sequences is distinguished by the fact that first parameters of the proportion of stray light can be determined, and that they are determined independently of the 3D point cloud which either still has to be detected or already has been detected. The first step sequence thus does not "need" the 3D point cloud at all and, therefore, can be applied especially prior to or during detection thereof, between detections of individual 3D points. Hence, the first step sequence is effective in a proactive manner. The second step sequence, on the other hand, is based on the fact that second parameters of the proportion of stray light are determined depending on the generated 3D point cloud. Thus, it is effective in a reproducing or correcting manner. Then, the proportion of stray light is compensated in a step of compensating the proportion of stray light as a function of the first parameters and/or the second parameters, depending on whether only the first, only the second or both of the step sequences were applied.

By optionally carrying out only one or both of the step sequences, the method according to the disclosure allows to flexibly compensate the stray light of the 3D laser scanner in a way adapted to existing field conditions. In this way, the quality of the stray light compensation, and as a consequence the quality of the data acquired, is improved.

In one example, the two step sequences are used, either individually or in combination, depending on an environment detected by the 3D laser scanner.

In particular by the use of both step sequences, the proportion of stray light cannot only be determined or identified prior to the detection on the laser scanner itself, but can also be accurately determined and compensated during detection of the object or even thereafter. In this way, even higher intensities of the proportion of stray light (especially in the case of a soiled rotor glass which constitutes an exit of the emitter) can no longer affect any detected distance and intensity values of the detected 3D points of the object.

Preferably, determining and compensating the proportion of stray light is carried out by a control unit of the 3D laser scanner in each case.

In one example, the first step sequence includes a step in which a measuring beam is emitted via the emitter into a space portion away from the object, the space portion having no reflectivity or merely a sufficiently low reflectivity. Sufficiently low in this context refers to the fact that a proportion of reflection of the space portion is negligible vis-á-vis the proportion of stray light. Since there is no reflection, a signal adapted to be received by the receiver must be the signal of the proportion of stray light of the measuring beam.

The space portion can be selected depending on the environment of the detection. Accordingly, what is important is the afore-mentioned criterion of reflection. In one example, the space portion is a sufficiently object-free portion of the sky, viz. especially an unobstructedly visible portion of the sky without any objects such as roofs, transmission lines, clouds, fog, dust, which would provide for any interfering reflection.

Should no such space portion be visible from the location of the 3D laser scanner, for example due to the weather situation or because the detection is carried out indoors, alternatively the space portion may be in the form of a board, a box or the like having an absorbing coating, in particular having a VANTA (Vertically Aligned Nano Tube Array) coating. This coating is so black that it can sufficiently absorb even a measuring beam of a 3D laser scanner.

In one example, suitable space portions can be selected manually or via the control unit at least depending on the degrees of reflection and/or angles of elevation thereof and on an appropriately associated criterion. The first step sequence is supplemented by this step in the example.

Subsequently, in one example the first step sequence includes the steps of receiving the proportion of stray light of the emitted measuring beam via a receiver of the 3D laser scanner and determining the first parameters of the proportion of stray light via a control unit of the laser scanner.

In one example, the compensation of the stray light can be put on a broader data basis by means of the first parameters by the first step sequence being carried out in plural space portions having the afore-mentioned reflection characteristic, wherein the first parameters determined in this way are averaged through the space portions. This is preferably done by the control unit. This is done prior to and/or during the current detection of the 3D point cloud, while the laser scanner anyway horizontally scans an angle of rotation of up to 3600 and vertically scans an angle of elevation of up to 320°.

As first parameters, especially for quantifying the proportion of stray light, at least an intensity of the proportion of stray light and the phase shift thereof to the emitted measuring beam are suited, or in plural space portions the respective mean value is suited.

With the target of enhancing the quality of the compensation, in one example only a subset of the space portions selected as afore described is taken into account when determining the first parameters of the mean values thereof.

In one example, the method includes steps for generating the 3D point cloud: emitting a measuring beam onto the object via the emitter; receiving a proportion of the measuring beam via the receiver; determining parameters of intensity of the proportion and phase shift of the proportion to the emitted measuring beam via the control unit; generating a 3D point as a function of said parameters via the control unit; and generating the 3D point cloud by repeatedly emitting the measuring beam onto the object, receiving the proportion of the measuring beam, determining the parameters and generating the 3D point via the control unit.

Based on the 3D point cloud, viz. depending thereon, the second step sequence—with or without the first step sequence—can be applied for compensating the proportion of stray light.

In one example of the method, the second step sequence includes a step of analyzing the 3D point cloud for waves depending on the proportion of stray light or for such a wave structure, and a step of determining the second parameters from the waves or the wave structure; both steps are preferably carried out via the control unit.

The analysis of the waves or the wave structure is based, in one example, on the fact that the waves of the 3D point cloud resulting from the proportion of stray light are distinguished by a characteristic dependence of their wavelength and wave height on their pixel intensity. The 3D point cloud is analyzed for this characteristic dependence via the control unit, and the waves of the 3D point clouds showing said dependence are identified.

In one example, then the second parameters, in particular an intensity of the proportion of stray light and a phase shift of the proportion of stray light to the measuring beam, are estimated and/or determined from intensities and phases of the identified waves.

In one example of the method in which at least, as afore described, the first parameters were determined, a measuring beam was emitted onto the object, by the latter the proportion of the measuring beam was reflected and the parameters of the proportion were determined, the 3D point then is generated as a function of the parameters of the proportion and to the first parameters of the proportion of stray light. In particular, for this purpose the difference from the proportion and the proportion of stray light is formed. More precisely, for determining the intensity of the 3D point, the intensity of the proportion of stray light is deducted from the intensity of the proportion. For determining the distance of the 3D point, the phase shift of the proportion of stray light is deducted from the phase shift of the proportion. In this way, the 3D point is generated and stored via the control unit.

Irrespective of whether the first step sequence and the related compensation of stray light was carried out already, the second step sequence in one example includes a step of correcting the 3D point cloud as a function of the parameters and to the second parameters, especially as a function of the difference thereof. In this way, the 3D point cloud is generated and stored via the control unit.

Of course, it is not possible to compensate arbitrarily large intensities of the proportion of stray light. In the case that the proportion of stray light is determined to be too high, if for example a transparent cover of the emitter through which the measuring beam is emitted is excessively soiled, the method in one example therefore includes a step that suppresses or interrupts the detection and/or outputs a warning message. In one example, it is a criterion for triggering the step or steps whether the determined proportion of stray light, especially the intensity thereof, is above a predetermined limit value which is especially stored in the control unit. The warning message is, for example, an invitation issued to an operating person to clean the cover or the rotor disk and, where necessary, to repeat the laser scan.

In one example, the method is carried out from one or from more locations of the 3D laser scanner.

In one example, the 3D laser scanner includes a transparent exit of the emitter for emitting the measuring beam and, in spatial vicinity of or coinciding with the exit, a transparent entry of the receiver for receiving at least the proportion of the measuring beam reflected by the object.

According to the disclosure, the control unit is configured so that the method for determining and compensating the proportion of stray light configured according to at least one aspect of the foregoing description is stored in the control unit for implementation.

Applicant reserves the right to direct a set of claims to a 3D laser scanner according to at least one aspect of the preceding description.

BRIEF DESCRIPTION OF DRAWINGS

Hereinafter, an example of the method according to the disclosure will be illustrated in detail in the Figures, wherein.

DESCRIPTION

Figure 1:
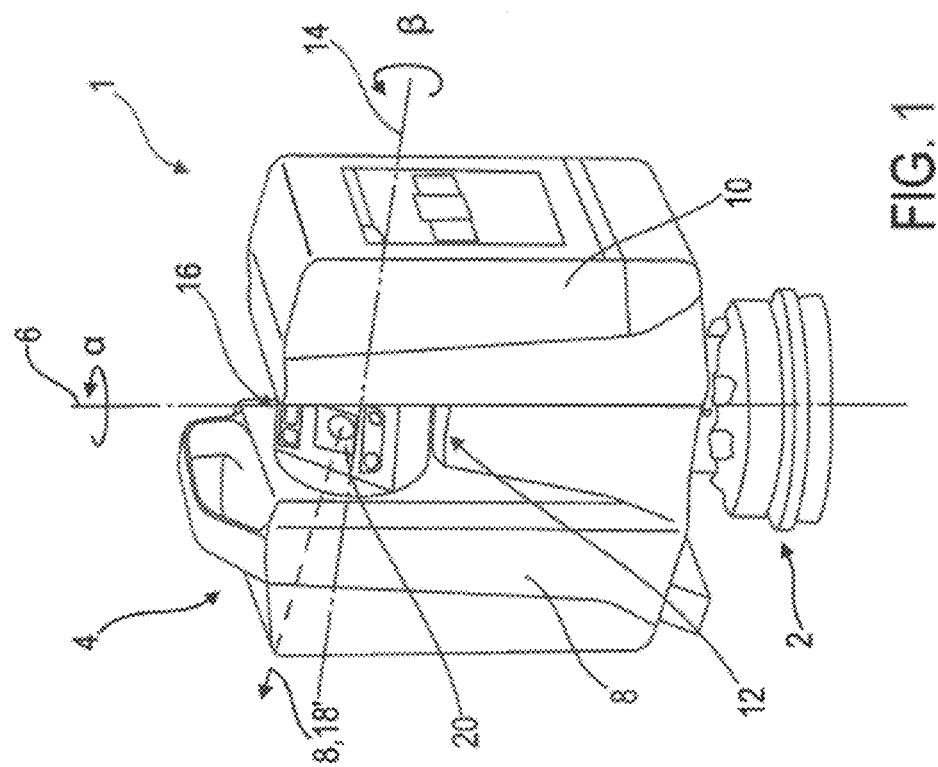
FIG. 1 shows a 3D laser scanner according to the disclosure in which a method according to the disclosure is stored for implementation.

FIG. 1 illustrates a 3D laser scanner 1 comprising a base 2 and a housing 4 attached thereto. The latter is rotatable about a vertical axis 6 by a motor (not shown) integrated in the base 2 at an angle of rotation a. The housing 4 includes two substantially symmetric portions 8, 10 supporting accumulators, electronics, a control unit and other components of the laser scanner 1. In the center between the portions 8, 10, the housing is formed to have a yoke 12 through which the portions 8, 10 are connected. Above the yoke 12, a measuring head 16 rotatable about a transverse axis 14 at the angle of elevation p is accommodated via which measuring head 16 a measuring beam 18 can be emitted onto an object 22 to be detected. The measuring head 16 includes a transparent cover glass 20 behind which deflecting optics for emitting the measuring beam 18 and finally for receiving a reflected proportion 18' of the measuring beam 18 are protected. For detecting the object, the laser scanner 1 rotates about its vertical axis 6 at up to 360° and the measuring head 16 rotates about its transverse axis 14 at up to 320°.

Such laser scanner 1 is sufficiently known, apart from the method described in the following, from prior art, for example as Applicant's Imager® 5016, so that further explanations in this respect can be dispensed with.

Figure 2:
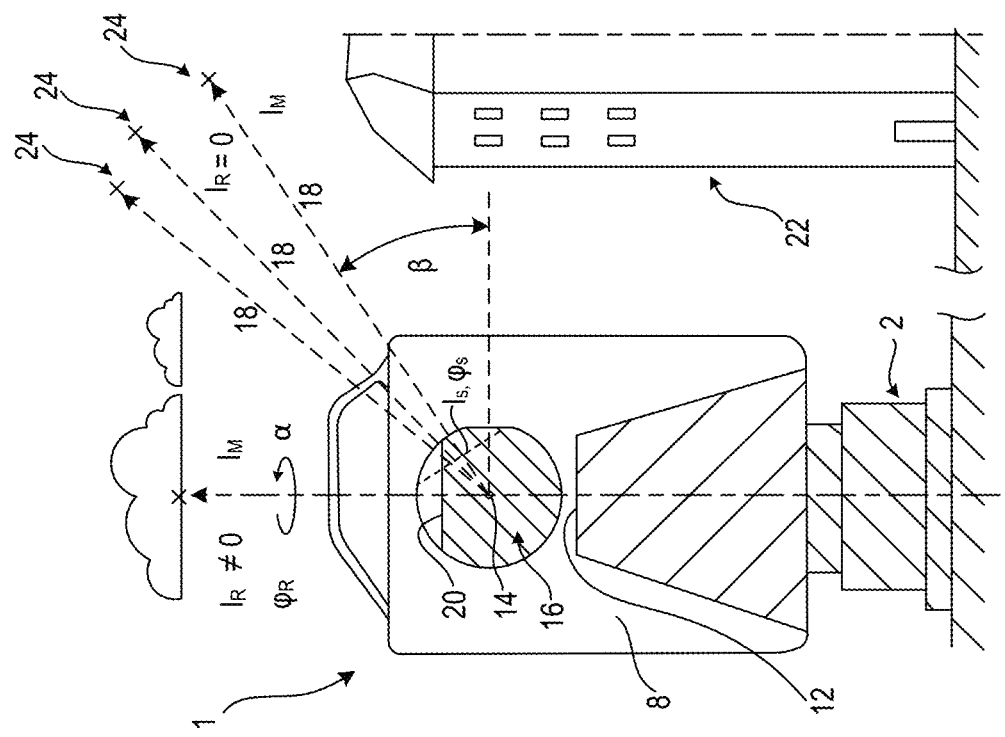
FIG. 2 shows the laser scanner according to FIG. 1 shown in cross-section in its measuring environment and with an object to be detected.

FIG. 2 illustrates the laser scanner 1 according to FIG. 1 in cross-section in its measuring environment and with the object 22 to be detected. The laser scanner 1 is shown in a cut state, with the sectional plane extending from the vertical axis 6 so that it forms a plane of symmetry of the two portions 8, 10 of the housing 4. Cut areas are hatched to facilitate representation, although in reality they are naturally hollow to a certain extent so that they can incorporate the afore-mentioned components.

In the shown embodiment of the method, the laser scanner 1 is positioned outdoors, though it can also be used indoors. The object (building) 22 is arranged at a comparatively large distance from the laser scanner 1. Those detections over large distances are particularly susceptible to errors of stray light. Light that passes from the emitter of the laser scanner directly to the receiver without having been incident on the object 22 to be detected is referred to as stray light or proportion of stray light. Frequently, soiling of the cover glass 20 of the measuring head 16 in which the exit of the emitter and the entry of the receiver are arranged is responsible for this. Such soiling results in the afore-mentioned scattering.

Thus, in the case of corresponding soiling of the cover glass 20, an intensity $I_S$ of the proportion of stray light of the measuring beam 18 and a phase shift $\varphi_S$ of the proportion of stray light based on the emitted measuring beam 18 are associated with each emitted measuring beam 18 having the intensity $I_M$. As afore illustrated, the intensities $I_R$ and $I_S$ of a reflected proportion 18' of the measuring beam 18 and of the proportion of stray light of the measuring beam 18 sum up. The same applies mutatis mutandis to the phase shifts $\varphi_R$ and $\varphi_S$ thereof. As a consequence, the 3D point cloud is incorrectly detected via the control unit of the laser scanner 1 unless the proportion of stray light is compensated.

For determining and compensating said proportion of stray light, and thus for increasing the accuracy of the detection, the method according to the disclosure is applied.

Figure 3:
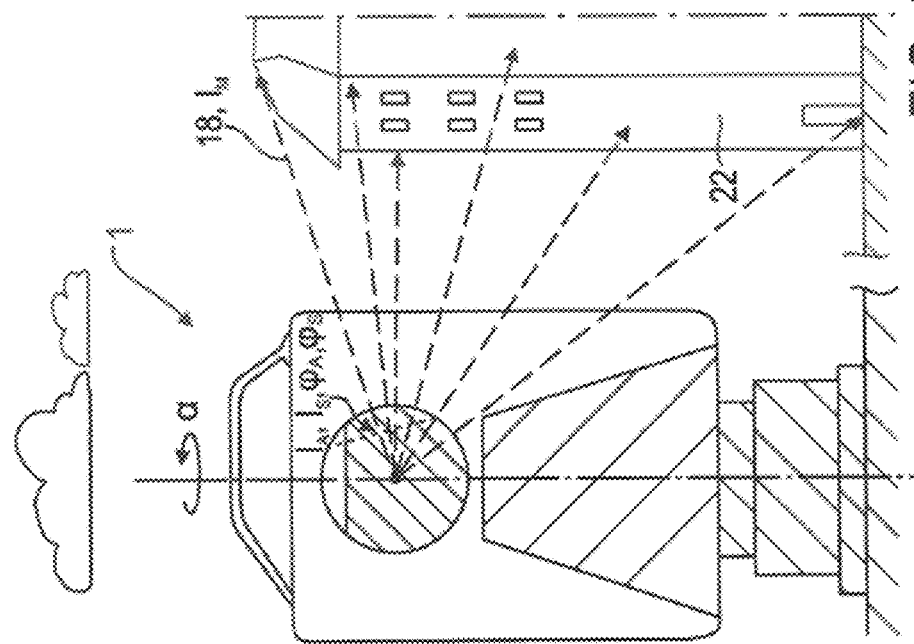
FIG. 3 shows the laser scanner according to FIG. 2 when detecting the object.

In the shown example, the starting situation for this is an arrangement of the laser scanner 1 relative to the object 22 according to FIG. 3, viz. under outdoor conditions. The method can also be carried out indoors, viz. in interior rooms, of course, in an adapted variant.

Since, in the example, a sky free from objects or at least a low-reflection sky is visible from the location of the 3D laser scanner 1, irrespective of the 3D point cloud (this has not been detected yet) initially the first step sequence of the method is carried out. According to FIG. 2, at first a space portion 24 referred to as "free from objects" according to the foregoing description is determined. Said space portion 24 meets the criteria of a sufficiently large angle of elevation p and ideally has "zero" or at least sufficiently low reflectivity. Thus, the measuring beam 18 in the subsequent step emitted into said space portion 24 cannot be reflected so that a reflected proportion 18' of the measuring beam is zero. The parameters $I_R$ and $\varphi_R$ usually resulting from the reflection therefore are zero. The signal then received by the receiver consequently must be the proportion of stray light of the measuring beam 18 having an associated intensity $I_S$ and a phase shift cps to the emitted measuring beam 18. Of course, it must be pointed out here that also a certain receiving noise caused by the present sunlight and inherent noise of the receiving electronics is given. These first parameters $I_S$ and $\varphi_S$ originating from the first step sequence usually result from soiling of the cover 20.

In order to increase the reliability and the accuracy of the determined proportion of stray light and of its first parameters $I_S$ and $\varphi_S$, the first step sequence can be carried out for different space portions 24, wherein at the end the first parameters $I_S$ and $\varphi_S$ of the proportion of stray light are averaged over the space portions 24. In order to obtain first parameters $I_S$ and $\varphi_S$ which exhibit as little standard deviation as possible, averaging is carried out over an as large area of the space free from objects, viz. the sky.

The determined first parameters $I_S$ and $\varphi_S$ and, resp., the mean values thereof are incorporated, during the later step of generating a 3D point cloud 26 or 26' of the object 22 based on the scanning by measuring beams 18 (cf FIG. 3), in a respective difference with the proportions of the measuring beams 18 received by the receiver.

The first step sequence of the method can be carried out prior to detection or during detection of the 3D point cloud, i.e., in particular between the detections of individual 3D points.

For determining a space portion 24 free from objects having zero or sufficiently low reflection, the method in the first step sequence includes a step for selecting those space portions 24. They must meet the criterion of going below a limit value for a received intensity stored in the control unit of the laser scanner 1. In this way, space portions containing a remote building, trees, heavy clouds, dust or the like are not used for determining the first parameters $I_S$ and $\varphi_S$.

The space portions 24 are selected in the first step sequence by initially exactly analyzing individual pixels or 3D measuring points, as described by way of FIG. 2. Apart from the afore-mentioned criterion of intensity, also a stored angle of elevation p has to be exceeded, as only above said angle an open sky can be expected. From the space portions 24 meeting the criteria, in the first step sequence an intelligent or proprietary algorithm of the laser scanner 1 determines those of the space portions 24 which are actually used to determine the first parameters $I_S$ and $\varphi_S$ of the proportion of stray light.

Figure 5:
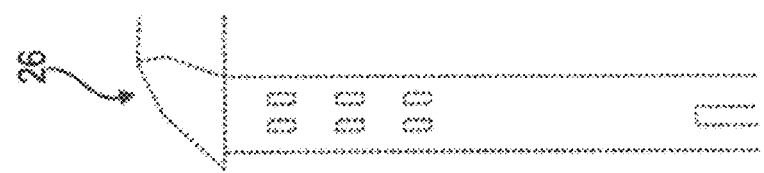
FIG. 5 shows a 3D point cloud of the object.

Under favorable circumstances, the described compensation based on the first step sequence of the method, viz. based on the described setting of the first parameters $I_S$ and $\varphi_S$ off against the signals received by the receiver, already results in the 3D point cloud 26 according to FIG. 5 which is sufficiently accurate.

Figure 4:
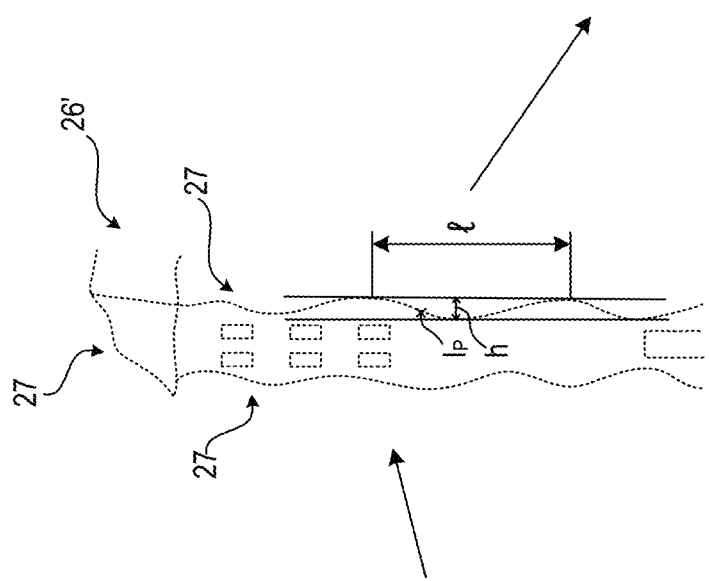
FIG. 4 shows a defective 3D point cloud of the object.

In case that the first step sequence cannot be carried out due to a lack of space portions 24 free from objects, for example when the detection takes place indoors or outdoors with an overcast or hazy sky, the method flexible according to the disclosure includes a second step sequence to determine and compensate the proportion of stray light which, unlike the first step sequence, is based on the detected 3D point cloud 26' according to FIG. 4.

Initially, the starting situation according to FIG. 3 when the first step sequence has been carried out according to the preceding description is assumed. However, the determination and compensation with the first parameters $I_S$ and $\varphi_S$ has not yet resulted in a sufficiently accurate point cloud so that said point cloud 26' has a deformed shape as exemplified in FIG. 4. Such shape results from larger stray light values or proportions which, due to a cyclic phase error, generate typical patterns in the detected 3D point cloud 26'. On surfaces they can be identified as waves similar to the waves of a water surface with a breeze. However, the waves usually are too small to be noticed by the user during detection. Therefore, FIG. 4 illustrates those waves in an extremely scaled representation.

According to the second step sequence of the method, those waves are specifically searched for in the 3D point cloud 26' and, resp., the latter is analyzed for them. The waves of the 3D point cloud 26' caused by stray light have a characteristic connection of their wavelength 1 and wave height h depending on their pixel intensity I. By a step for analyzing the 3D point cloud 26' directed to said characteristic, the waves, even those which would not be noticed by the human viewer, can be identified by the control unit of the laser scanner 1. In a subsequent step of the second step sequence, second parameters of the proportion of stray light can be estimated or determined from the identified waves. The second parameters then are set off against the 3D points of the already detected 3D point cloud. The remaining error of the proportion of stray light that resulted in the waves according to FIG. 4 is thus compensated. After carrying out the second step sequence, now the correct 3D point cloud 26 according to FIG. 5 is provided.

Alternatively or additionally to the compensation, a warning message can be output as a function of the determined first and/or second parameters of the proportion of stray light. For example, this could be an invitation to clean the cover glass 20 or the like.

A method is disclosed for determining and compensating a proportion of stray light of a measuring beam of a 3D laser scanner through which a 3D point cloud of an object to be detected can be generated via phase-based distance measurement. The method includes at least two different step sequences, viz. sub-methods, for determining and compensating which are applicable depending on the ambient conditions, the proportion of stray light, the user's option and/or the like either individually or in combination. One of the step sequences enables the determination and compensation independently of the 3D point cloud, the other depending on the detected 3D point cloud.

LIST OF REFERENCE NUMERALS 1 3D laser scanner
2 base
4 housing
6 vertical axis
8, 10 housing portion
10 housing portion
12 yoke
14 transverse axis
16 measuring head
18 measuring beam
18' reflected proportion of measuring beam
20 cover glass
22 object
24 space portion
26 compensated 3D point cloud
26' insufficiently compensated 3D point cloud
α angle of rotation
β angle of elevation
I intensity
φ phase shift
$I_M$ intensity of measuring beam
$I_R$ intensity of reflected proportion
$I_S$ intensity of proportion of stray light
$\varphi_R$ phase shift of reflected proportion
$\varphi_S$ phase shift of proportion of stray light

What is claimed is:

1. A method for determining and compensating a proportion of stray light of a measuring beam of a 3D laser scanner by which a 3D point cloud of an object to be detected is generated through phase-based distance measurement, comprising:

determining, during a first step sequence, first parameters of the proportion of stray light independently of the 3D point cloud;

determining, during a second step sequence, second parameters of the proportion of the stray light dependent on the generated 3D point cloud;

selecting whether the first parameters of the proportion of the stray light determined during the first step sequence or the second parameters of the proportion of the stray light determined during the second step sequence or both the first parameters of the stray light determined during the first step sequence and the second parameters of the stray light determined during the second step sequence is/are applied for determining the proportion of the stray light; and compensating the proportion of stray light as a function of the first parameters of the proportion of the stray light determined during the first step sequence and/or the second parameters of the proportion of the stray light determined during the second step sequence.

2. The method according to claim 1, wherein the first step sequence comprises a step of:

emitting the measuring beam via an emitter of the 3D laser scanner into a space portion away from the object which has no reflectivity or a reflectivity below a receiver noise caused by sunlight and inherent noise of receiving electronics.

3. The method according to claim 2, wherein the space portion is a sky portion free from objects, or wherein the space portion is a board, a box, or other surface having an absorbing coating.

4. The method according to claim 2, wherein the first step sequence moreover comprises steps of:

receiving the proportion of stray light of the emitted measuring beam via a receiver of the 3D laser scanner, and determining the first parameters of the proportion of stray light via a control unit of the 3D laser scanner.

5. The method according to claim 4, wherein the first step sequence is carried out in plural space portions and is supplemented by a step of:

averaging the first parameters of the proportion of the stray light over the plural space portions via the control unit.

6. The method according to claim 2, wherein the first parameters of the proportion of the stray light are at least an intensity of the proportion of the stray light and a phase shift of the proportion of the stray light to the emitted measuring beam, or mean values respectively of the intensity of the proportion of the stray light and the phase shift of the proportion of the stray light.

7. The method according to claim 2, wherein the first step sequence is supplemented by a step of:

selecting the space portion or portions at least as a function of a degree of reflection of the space portion or space portions and/or an angle of elevation of the space portion or space portions and of an associated criterion via a control unit.

8. The method according to claim 7, wherein a subset of the selected space portions is considered in the determination of the first parameters including an intensity of the proportion of the stray light and a phase shift of the proportion of the stray light, or mean values respectively of the intensity of the proportion of the stray light and the phase shift of the proportion of the stray light.

9. The method according to claim 1 comprising steps for generating the 3D point cloud of:

emitting a measuring beam onto the object via an emitter of the 3D laser scanner, receiving a proportion of the measuring beam via a receiver of the 3D laser scanner, determining parameters of intensity of the proportion and phase shift of the proportion to the emitted measuring beam via a control unit of the 3D laser scanner, generating a 3D point as a function of the determined parameters, wherein the determined parameters include the intensity of the received proportion of the measuring beam and the phase of the received proportion of the measuring beam; and generating the 3D point cloud by repeatedly emitting the measuring beam onto the object, receiving the proportion of the measuring beam, determining the parameters including the intensity of the received proportion of the measuring beam and the phase of the received proportion of the measuring beam and generating the 3D point via the control unit.

10. The method according to claim 9, wherein the second step sequence comprises steps of:

analyzing the 3D point cloud for waves depending on the proportion of stray light via a control unit of the 3D laser scanner, and determining second parameters from the waves via the control unit, wherein waves are patterns present in representations of surfaces in the 3D point cloud.

11. The method according to claim 10, wherein each of the waves depending on the proportion of stray light is distinguished by a characteristic connection of their wavelength and wave height depending on their pixel intensity.

12. The method according to claim 10, wherein the second parameters including the intensity of the proportion of the stray light and the phase shift of the proportion of the stray light to the measuring beam, are estimated or determined from intensities and phases of the waves.

13. The method according to claim 9 comprising a step of:

generating the 3D point as a function of the determined parameters including the intensity of the received proportion of the measuring beam and the phase of the received proportion of the measuring beam and the first parameters via the control unit.

14. The method according to claim 9, comprising a step of generating the 3D point as a function of a difference or differences of the parameters determined parameters and the first parameters, via the control unit.

15. The method according to claim 9 comprising a step of:

correcting the 3D point cloud as a function of the determined parameters and the second parameters as a function of a difference thereof via the control unit.

16. The method according to claim 1, wherein the detection is suppressed, interrupted and/or a warning message is output, when an intensity of the determined proportion of stray light is above a predetermined limit value.

17. The method according to claim 3, wherein the absorbing coating comprises a Vertically Aligned Nano Tube Array.

18. The method according to claim 10, wherein the patterns include peaks and valleys, and are characterized by a wavelength and a wave height.

* * * * *